(12) United States Patent
McHugh et al.

(10) Patent No.: US 7,264,836 B2
(45) Date of Patent: Sep. 4, 2007

(54) PRODUCTION OF TRIPLE COEXTRUDED BAKED BAR GOODS

(75) Inventors: Edward Kevin McHugh, Oakland, NJ (US); Robert John Profita, Morris Plains, NJ (US); Jill Margaret Critchley, Ridgewood, NJ (US); Nicole Remily, Verona, NJ (US)

(73) Assignee: Kraft Foods Holdings, Inc., Northfield, IL (US)

( * ) Notice: Subject to any disclaimer, the term of this patent is extended or adjusted under 35 U.S.C. 154(b) by 684 days.

(21) Appl. No.: 10/638,563

(22) Filed: Aug. 11, 2003

(65) Prior Publication Data

US 2004/0185158 A1  Sep. 23, 2004

Related U.S. Application Data

(60) Provisional application No. 60/456,454, filed on Mar. 21, 2003.

(51) Int. Cl.
*A21C 3/04* (2006.01)

(52) U.S. Cl. .................. 426/238; 426/497; 426/503; 426/516; 426/517; 426/518; 426/523

(58) Field of Classification Search ................ 426/238, 426/496, 503, 514, 516–518, 523, 497; 425/376.1, 425/382 R, 382.4, 461–463, 467
See application file for complete search history.

(56) References Cited

U.S. PATENT DOCUMENTS 2,092,160 A   9/1937   Hawerlander
2,615,809 A   10/1952  Jean (Continued)

FOREIGN PATENT DOCUMENTS

DE   3044535   6/1982

(Continued)

OTHER PUBLICATIONS

K. F. Graff, "Macrosonics in industry, 5. Ultrasonic machining," *Ultrasonics*, May 1975, pp. 103, 108-109, vol. 13, No. 3.

*Primary Examiner*—Drew Becker
(74) *Attorney, Agent, or Firm*—Hollander Law Firm, P.L.C.

(57) ABSTRACT

A triple coextruded baked good having a bar shape with a desired substantially smaller height than width, is continuously produced with distinct, at least substantially uniform concentric fillings which are visually apparent at opposing cut ends of the baked piece. The bar-shaped products are preferably cookies with dissimilar fillings, such as a fruit filling and a cheese-cake filling. Undesirable excessive flow of a middle filling or layer towards the cross-sectional ends or sides rather than the top and bottom of the coextrudate is substantially reduced by obstructing and diverting the flow of the middle filling through the middle die orifice so that it flows towards the top and bottom elongated portions of the middle annulus. A baked product having a substantially even middle concentric layer which is desirably uniformly thick and continuous at least across the top and bottom is obtained. Post-extrusion shaping or mechanical flattening of the dough with a roller is not needed to obtain a desired cross sectional shape having a substantially rectangular middle portion and curved or rounded shoulders, thereby avoiding sticking and tearing of the dough. Ultrasonic cutting of the baked product is employed to avoid substantial visual smearing of one layer of filling into another.

22 Claims, 9 Drawing Sheets

U.S. PATENT DOCUMENTS

| | | | |
|---|---|---|---|
| 3,031,804 | A | 5/1962 | Thatcher et al. |
| 3,184,358 | A | 5/1965 | Utz |
| 3,241,503 | A | 3/1966 | Schafer |
| 3,477,851 | A | 11/1969 | Benson et al. |
| 3,646,894 | A | 3/1972 | Hasten et al. |
| 3,657,033 | A | 4/1972 | Sager |
| 3,679,526 | A | 7/1972 | Horton |
| 3,756,111 | A | 9/1973 | Weidenmiller |
| 3,817,141 | A | 6/1974 | Simonetti |
| 3,851,084 | A * | 11/1974 | Rossen et al. ............... 426/249 |
| 3,957,566 | A | 5/1976 | Rahlfs |
| 4,125,585 | A | 11/1978 | Rosenbaum |
| 4,144,882 | A | 3/1979 | Takemoto et al. |
| 4,185,954 | A | 1/1980 | Murakami et al. |
| 4,244,974 | A | 1/1981 | Minami et al. |
| 4,266,920 | A | 5/1981 | Hayashi et al. |
| 4,364,882 | A | 12/1982 | Doucet |
| 4,488,464 | A | 12/1984 | Rooke et al. |
| 4,499,845 | A | 2/1985 | Pope |
| 4,567,797 | A | 2/1986 | Folk |
| 4,569,848 | A | 2/1986 | Giorgetti et al. |
| 4,579,744 | A | 4/1986 | Thulin et al. |
| 4,630,533 | A | 12/1986 | Schaaf et al. |
| 4,672,872 | A | 6/1987 | Kuehnert |
| 4,674,968 | A | 6/1987 | Durst |
| 4,675,199 | A | 6/1987 | Hsu |
| 4,689,236 | A | 8/1987 | Pinto |
| 4,698,004 | A | 10/1987 | Ramnarine |
| 4,715,803 | A * | 12/1987 | Koppa ..................... 425/133.1 |
| 4,731,002 | A | 3/1988 | Spence et al. |
| 4,735,566 | A * | 4/1988 | Squicciarini ................ 425/312 |
| 4,748,031 | A | 5/1988 | Koppa |
| 4,786,243 | A * | 11/1988 | Kehoe .................... 425/131.1 |
| 4,834,999 | A | 5/1989 | Matthews et al. |
| 4,846,648 | A | 7/1989 | Spence et al. |
| 4,882,185 | A | 11/1989 | Simelunas et al. |
| 4,888,192 | A | 12/1989 | Ramnarine |
| 4,925,380 | A | 5/1990 | Meisner |
| 4,975,288 | A | 12/1990 | Hager et al. |
| 5,125,819 | A | 6/1992 | Hager et al. |
| 5,146,844 | A | 9/1992 | Dubowik et al. |
| 5,208,059 | A | 5/1993 | Dubowik et al. |
| 5,318,417 | A | 6/1994 | Kopp et al. |
| 5,324,187 | A | 6/1994 | Cook |
| 5,419,696 | A * | 5/1995 | Henson ................... 425/382.4 |
| 5,492,706 | A * | 2/1996 | Cockings et al. ........... 426/282 |
| 5,626,892 | A | 5/1997 | Kehoe et al. |
| 5,670,185 | A * | 9/1997 | Heck et al. ............... 425/133.1 |
| 5,686,128 | A | 11/1997 | Tracy et al. |
| 5,762,971 | A | 6/1998 | Schirmer |
| 5,955,116 | A | 9/1999 | Kehoe et al. |
| 6,000,926 | A | 12/1999 | Schirmer |
| 6,039,554 | A | 3/2000 | Akutagawa |
| 6,109,006 | A | 8/2000 | Hutchinson |
| 6,200,125 | B1 | 3/2001 | Akutagawa |
| 6,277,420 | B1 | 8/2001 | Andersen et al. |
| 6,383,539 | B1 | 5/2002 | Akutagawa |
| 6,528,102 | B1 | 3/2003 | Coyle et al. |
| 6,530,768 | B1 * | 3/2003 | Harrop ..................... 425/174.2 |
| 6,592,928 | B2 | 7/2003 | Makela et al. |
| 6,616,963 | B1 | 9/2003 | Zerby et al. |
| 6,620,448 | B2 | 9/2003 | Keller et al. |
| 6,623,784 | B2 | 9/2003 | Zerby et al. |
| 6,632,466 | B2 * | 10/2003 | Roussel et al. ............. 426/516 |
| 6,660,317 | B1 | 12/2003 | Akutagawa |
| 6,783,787 | B2 * | 8/2004 | Bortone ...................... 426/516 |
| 6,830,766 | B2 * | 12/2004 | McCabe ...................... 426/89 |
| 2002/0043740 | A1 | 4/2002 | Akutagawa |
| 2002/0058102 | A1 | 5/2002 | Makela et al. |

FOREIGN PATENT DOCUMENTS

| | | |
|---|---|---|
| EP | 0 320 580 A2 | 6/1989 |
| EP | 0 320 580 A3 | 6/1989 |
| EP | 0 322 952 B1 | 4/1992 |
| EP | 0 320 580 B1 | 7/1993 |
| GB | 1 354 505 | 5/1974 |
| GB | 2 136 666 A | 9/1984 |
| GB | 2 185 931 | 8/1987 |
| JP | 60-70036 | 4/1985 |
| JP | 6030707 | 2/1994 |
| WO | WO 03/043437 A1 | 5/2003 |

* cited by examiner

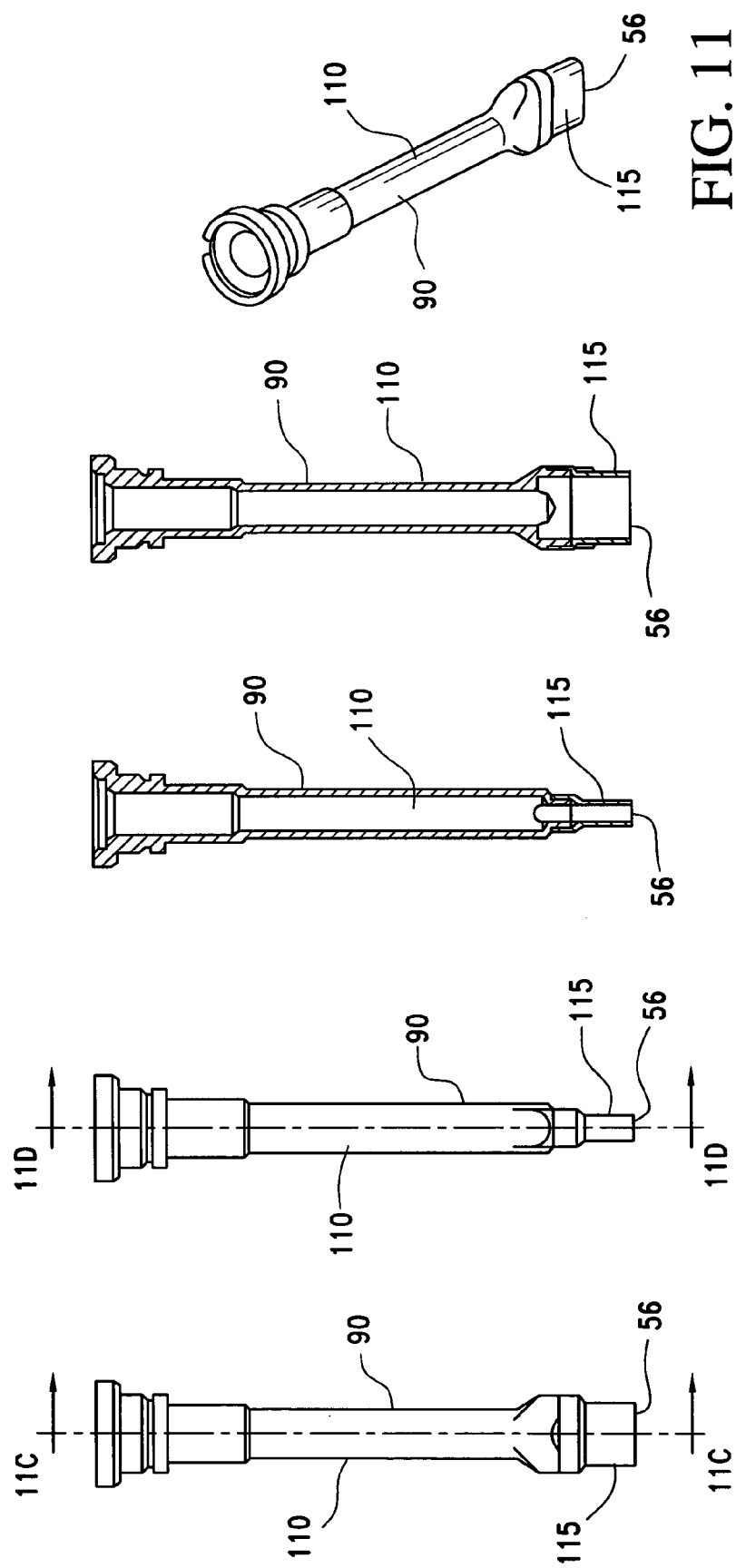

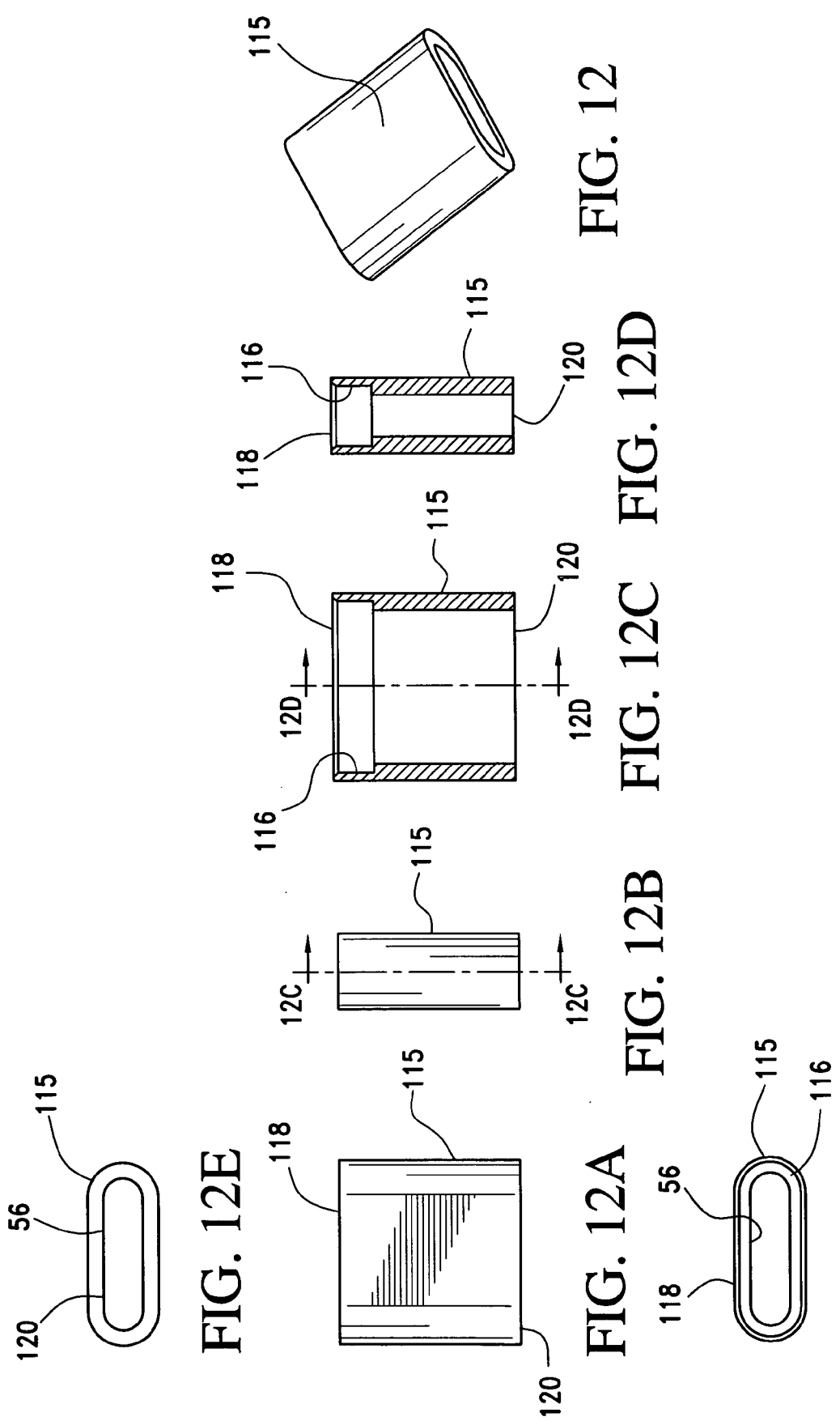

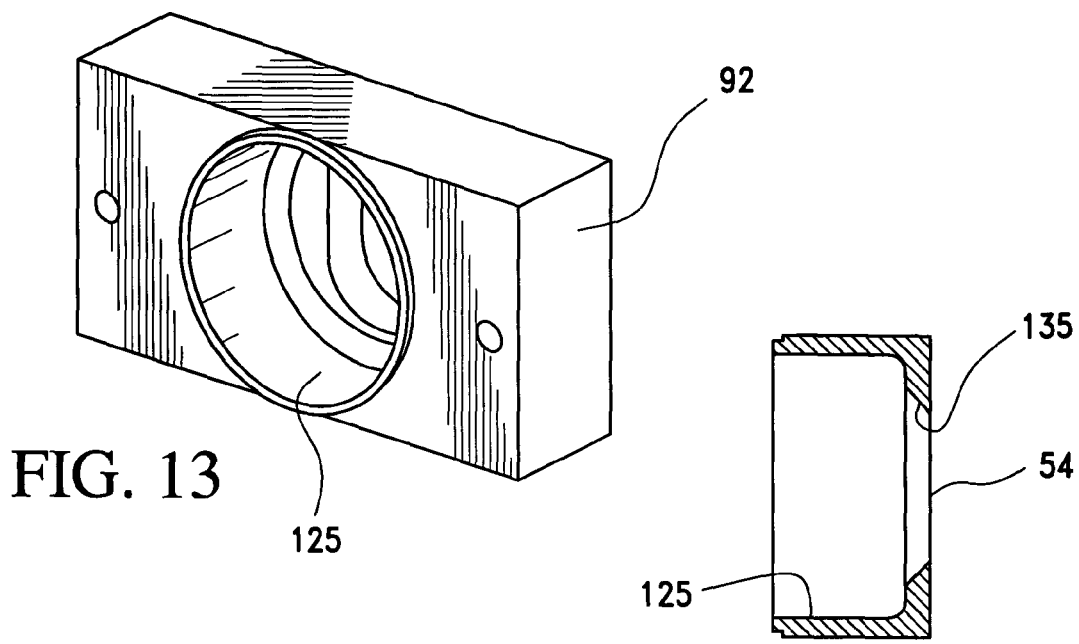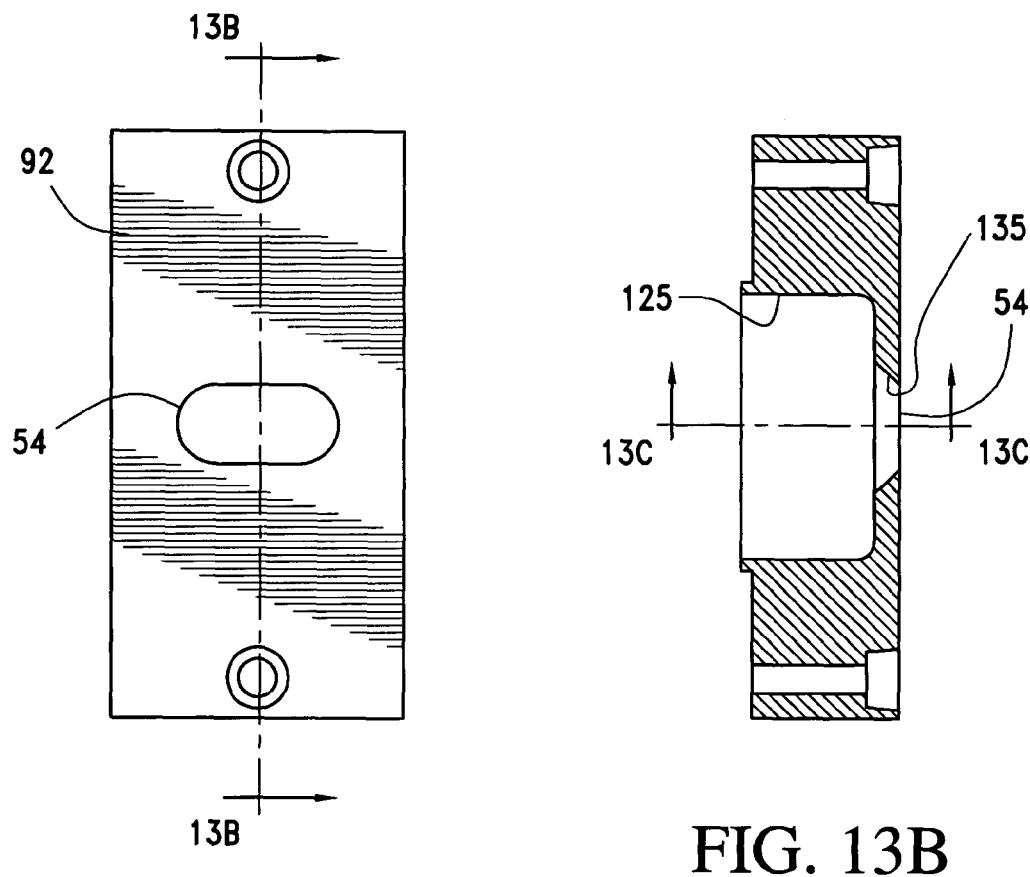

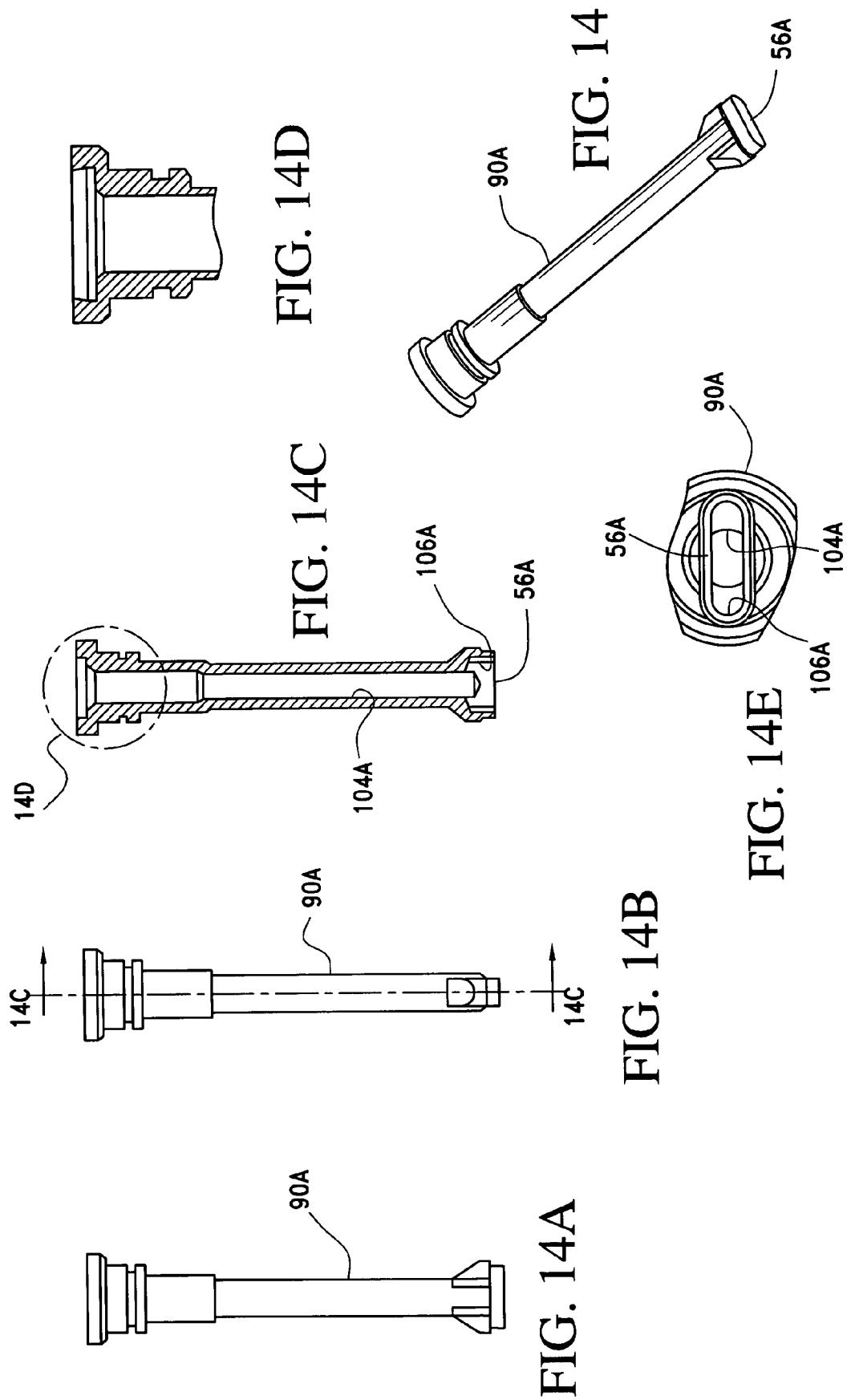

PRODUCTION OF TRIPLE COEXTRUDED BAKED BAR GOODS

RELATED APPLICATIONS

This application claims priority under 35 U.S.C. 119(e) of provisional application U.S. Ser. No. 60/456,454, filed Mar. 21, 2003 in the name of McHugh et al, for "Production of Triple Coextruded Baked Bar Goods," the disclosure of which is incorporated by reference in its entirety.

FIELD OF THE INVENTION

This invention relates to the production of bar-shaped baked goods having two visually apparent fillings using triple coextrusion.

BACKGROUND OF THE INVENTION

In the mass production of snack foods or other food products, the extrusion process may be employed because it economically provides a high volume of product having a uniform configuration and structure. Usually, when designing an extrusion process and/or apparatus, the desired properties of the end product must be considered along with the processing characteristics of the individual components that make up the product. Often, these considerations may require the use of a specific method and/or apparatus to achieve a particular result.

In the design of mass production facilities for the coextrusion of snack products, flow properties such as viscosity, handling properties or other processing characteristics of a particular material stream must be factored in. Certain material streams may be sensitive to variations in flow rate or direction caused by a circuitous flow path or obstacles in the flow path. Problems may arise such as high back pressure, insufficient mass flow rate and non-uniformity of individual layers in the product.

Certain materials may require an extremely smooth and uninterrupted flow path in order to remain either in an integral flow stream or a divided flow stream which is easily reformed into an integral one. If a change of direction occurs or an obstacle is present in the flow path, reformation may be difficult to achieve because the discrete streams may not reunite to form a uniform, integral flow. In this instance, the resultant product may have unacceptable qualities such as seam lines or striations.

In other instances, smooth flow paths for the individual streams may be required to prevent back pressure in pumps and related equipment and low mass flow rates, especially for viscous materials.

Also, coextrusion apparatus often have many potential leak points, due to their multiple parts, complex configurations and high operating pressures. As the number of concentric layers increase in a coextrudate, for example when three or more layers are desired, die complexity increases quite rapidly. Generally, more parts are needed, flow paths become disrupted by inlet passages, more potential leak points are created, tolerances in the concentric passageways become tighter, flow path directions change more frequently or abruptly, and back pressures increase. These problems tend to become even more exacerbated as the desired final diameter of the coextrudate rope and final product decreases. In producing coextrudate ropes wherein one or more concentric layers expand upon exiting the extrusion die, the concentric passageways must be even smaller in diameter to achieve a desired final coextrudate rope diameter. For example, when coextruding a plurality of fillers with an expandable farinaceous-based cooked casing, from a cooker extruder, the casing may expand substantially upon exiting the triple coextrusion die. The outer concentric passage for the casing, and hence the remaining inner passageways for the fillings must be sized substantially smaller than the desired diameter of the expanded final product.

After the extrusion step, certain food or snack products are sometimes shaped in a manner to make them more aesthetically pleasing and/or bite-size. This usually requires post-extrusion processing by way of, for example, a candy making machine which severs the rope into individual pieces having the shape of the individual molds of the candy machine. In the instances where this type of post-extrusion processing is used, the extrudate rope to be fed into the post-extrusion step should have a diameter substantially the same size as the diameter of the final product or the mold. Matching of the diameters helps to avoid the production of excessive scrap during the continuous molding operation. For example, if a peanut shell-shaped expanded snack product is desired, the expanded extrudate rope should be substantially the same in diameter as the diameter of the final peanut product. The final product diameter may be relatively small if simulation of an actual peanut shell size or bite-size pieces are desired.

U.S. Pat. Nos. 4,715,803 and 4,748,031 to Koppa disclose an extruder which provides a triple coextruded product having an inner layer, which is surrounded, or enrobed, by an intermediate layer, which is surrounded, or enrobed, by a third outer-most layer. The inner layer is a dough having a chewy and moist texture when baked and the outer layer is a dough having a crispy texture after baking. These patents relate specifically to the introduction of a barrier material between the two dough layers in order to achieve the desired product stability and shelf life. The moisture barrier is injected through the outer cylindrical layer in a tube upstream of the extruder outlet.

A pillow-shaped product, having an outer layer of expanded dough and two different filler materials is disclosed in U.S. Pat. Nos. 4,698,004 and 4,888,192 to Ramnarine. The penetration of the outer expansible dough by the inner fillers in the end product is avoided through the use of a nozzle which can be adjusted to compensate for the effects of the fluid flow of the individual streams. The process is directed to the side-by-side extrusion of the filler materials.

U.S. Pat. No. 3,241,503 to Schafer discloses a die for the manufacture of cookies with concentric rings of different colored dough. The process involves introducing successive layers of dough through conduits perpendicular to the die into annular cavities surrounding a longitudinally extending bore.

U.S. Pat. No. 4,834,999 to Matthews et al discloses triple coextruding a meat-based product comprising whole muscle body surrounding a core stuffing, an outer casing, and an annular layer of fat between the whole-muscle body and the outer casing.

U.S. Pat. No. 5,686,128 to Tracey et al discloses the production of a triple coextruded snack having a casing material which may be a dough or an expansible dough such as a cookie dough, or cracker dough enrobing two fillers. The triple coextrusion apparatus includes a unitary die block for all three materials and has smooth and uninterrupted flow paths. A small diameter extrudate rope is produced with a central filler enrobed by an outer filler, subsequently enrobed by an outer casing formed from multiple streams. The outer casing material streams reform into an integral concentric layer having no or substantially no seam lines or striations in the outer casing. The extrudate ropes may be sufficiently small in diameter, even when the casing is expanded, to allow feeding into a candy machine for shaping by molding or crimping to produce small diameter snack products without substantial waste or scrap material.

Japanese Patent Publication No. 60-070036, published Apr. 20, 1985, discloses production of three-layered soft food by extruding a core layer, interlayer, and outer layer at the same time to mold a three-layered cylindrical material, rolling the material while cut into a given size using a cutting and rolling means, and molding the material.

Coextrusion is also used to manufacture multi-layered plastic articles. For example, U.S. Pat. No. 4,185,954 to Murakami, et al., U.S. Pat. No. 5,318,417 to Kopp, et al., and U.S. Pat. No. 5,324,187 to Cook describe apparatus and processes for manufacturing multilayered tubular or hollow plastic products where each outer layer is successively added downstream to surround the upstream added inner material or materials.

U.S. Pat. No. 4,125,585 to Rosenbaum, U.S. Pat. No. 4,731,002 to Spence, et al., and U.S. Pat. No. 4,846,648 to Spence, et al. describe method and apparatus for manufacturing multilayered plastic pipe where the inner layer is injected across the central layer and through a spider.

U.S. Pat. No. 4,364,882 to Doucet describes method and apparatus for manufacturing multilayered plastic pipe where the central layer is injected across the outer layer through a trefoil.

German patent DT 3044535 (published Jun. 24, 1982) describes method and apparatus for manufacturing multi-layered plastic pipe where one or two central layers are injected across the outer layer.

In producing an extruded baked good having a desired bar shape, such as a FIG NEWTON®, configuring die orifices to the same bar shape or cross-section desired for the baked good can result in an extruded, unbaked dough with the desired shape. However, the dough rope shape or cross-section may change substantially during baking due to oven spread resulting in an undesirable baked good shape, such as a baked product which is too thin. The shape of the die orifices may be changed, for example to increase the height of the extruded dough rope so that upon baking the extrudate rope spreads into the thinner desired shape. However, it has been found that the use of concentric, circular die orifices to produce a cylindrical dough rope results in insufficient oven spread to produce a desirable, bar-shaped baked good.

It has also been found that in producing a baked, bar-shaped product having a plurality of concentric fillings, which are visually apparent at each end of the bar, the use of a roller to flatten a cylindrical dough rope to achieve a desired bar shape results in sticking of the outer dough casing to the roller and tearing of the dough rope and base cake. Also, it has been found that in producing a triple coextruded dough rope having a cross-section with a substantially smaller height than width, without the use of a roller, the middle layer or filling tends to flow towards the ends rather than the top and bottom. The resulting baked product tends to have a substantially uneven middle concentric layer which is excessively thin or discontinuous at the top and bottom, particularly as the cross-sectional height to width ratio of the dough rope decreases.

Also, as the height or thickness of the dough rope decreases along with the thickness of the filler layers, cutting of the baked rope tends to result in more visual smearing of one layer of filling into another.

The present invention provides a method for producing a triple coextruded baked good having a bar shape with a substantially smaller height than width, such as a FIG NEWTON® shaped product, without the need for post-extrusion shaping or mechanical flattening of the dough with a roller, thereby avoiding sticking and tearing of the dough by the shaping equipment. Triple coextruded bar shaped products such as cookies with dissimilar fillings, such as a fruit filling and a cheese-cake filling, may be continuously produced on a mass production basis. The present invention provides for the production of baked goods having distinct, at least substantially uniform concentric fillings which are visually apparent at opposing cut ends of the baked piece. Undesirable excessive flow of a middle filling or layer towards the cross-sectional ends or sides rather than the top and bottom of the coextrudate is substantially reduced. Control of the flow of the middle filling results in a baked product having a substantially even middle concentric layer which is desirably uniformly thick and continuous at least across the top and bottom. Cutting of the baked product is accomplished without any substantial visual smearing of one layer of filling into another.

SUMMARY OF THE INVENTION

The present invention provides an apparatus and method for the production of a baked good or snack in bar form having a cross sectional width that is substantially greater than the cross-sectional height using triple coextrusion. In embodiments of the invention, the ratio of the maximum cross-sectional width to the maximum cross-sectional height of the baked good may be at least about 1.75:1, generally at least about 2.5:1, for example from about 2.7 to 4:1, preferably about 3:1. The snack bar, such as a cookie may be baked from a triple coextruded rope having a casing, such as a cookie dough enrobing two concentric fillers.

The triple coextruded rope may be produced by coextruding a dough and two dissimilar first and second fillings through three concentric die orifices wherein the dough is extruded through the outermost die orifice, the first filling or core is extruded through the innermost die orifice, and the second or middle filling is extruded through the middle die orifice.

Undesirable excessive flow of the middle or second filling or layer towards the cross-sectional ends rather than the top and bottom of the coextrudate is substantially reduced by diverting and constricting or obstructing the flow of the second or middle filling through the middle die orifice so that it flows towards the top and bottom elongated portions of the middle annulus. The diversion or obstruction results in an extrudate rope and a baked product having a substantially even middle concentric layer which is desirably uniformly thick and continuous at least across the top and bottom. The middle concentric layer may be thicker or substantially the same width-wise at its opposing end portions compared to its thickness height-wise at its top and bottom portions.

The diversion or obstruction may be achieved with the use of pins located in the middle annulus, extending or protruding from the outer wall of the middle annulus towards the inner wall of the middle annulus. The pins help to increase pressure in the thicker end regions of the middle annulus and direct flow of the middle layer or second filler to the thinner top and bottom regions of the middle annulus thereby preventing unevenness and discontinuity in the top and bottom regions.

Substantial visual smearing of one filler layer, such as a red colored cherry filling, into the other, such as a white cheese-cake filling, and vice verse is avoided or eliminated by cutting of the baked product preferably with an ultrasonic cutter.

BRIEF DESCRIPTION OF THE DRAWINGS

FIG. 11 is a rear perspective view of a core or central nozzle of the extrusion block for extrusion of the core or central filler which is the innermost or first layer of the baked good of FIG. 1.

FIG. 11A is a top view of the core or central nozzle of FIG. 11.

FIG. 11B is a side view of the core or central nozzle of FIG. 11.

FIG. 11C is a cross-sectional view along line 11C-11C of FIG. 11A.

FIG. 11D is a cross-sectional view along line 11D-11D of FIG. 11B.

FIG. 12 is a perspective view of the terminal or end portion of the core or central nozzle of FIG. 11.

FIG. 12A is a top view of the core or central nozzle terminal or end portion of FIG. 12.

FIG. 12B is a side view of the core or central nozzle terminal or end portion of FIG. 12.

FIG. 12C is a cross-sectional view along line 12C-12C of FIG. 12B.

FIG. 12D is a cross-sectional view along line 12D-12D of FIG. 12C.

FIG. 12E is a front view of the downstream or exit end of the core or central nozzle terminal or end portion of FIG. 12.

FIG. 12F is rear view of the upstream end of the core or central nozzle terminal or end portion of FIG. 12.

FIG. 13 is a rear perspective view of the outer or casing nozzle or die block of the extrusion block for extrusion of the casing which is the outermost layer of the baked good of FIG. 1.

FIG. 13A is a front view of the downstream or exit end of the outer or casing nozzle or die block of FIG. 13.

FIG. 13B is a cross-sectional view along line 13B-13B of FIG. 13A.

FIG. 13C is a cross-sectional view along line 13C-13C of FIG. 13B.

FIG. 14 is a perspective view of a preferred, one piece core or central nozzle of the extrusion block for extrusion of the core or central filler which is the innermost or first layer of the baked good of FIG. 1.

FIG. 14A is a top view of the core or central nozzle of FIG. 14.

FIG. 14B is a side view of the core or central nozzle of FIG. 14.

FIG. 14C is a cross-sectional view along line 14C-14C of FIG. 14B.

FIG. 14D is a detail view of detail 14D in FIG. 14C.

FIG. 14E is a partial detailed view of the front or exit end of the core or central nozzle of FIG. 14.

DETAILED DESCRIPTION OF THE INVENTION

The present invention provides a method for producing a triple extrusion, or triple coextruded baked good having a bar shape with a substantially smaller height than width. For example, the ratio of the maximum cross-sectional width to the maximum cross-sectional height of the baked good may be at least about 1.75:1, generally at least about 2.5:1, for example from about 2.7 to 4:1, preferably about 3:1. Post-extrusion shaping or mechanical flattening of the triple extruded product with a roller is not needed prior to or after baking to achieve an oblong or curved rectangle cross-sectional shape in a triple coextruded baked snack. Elimination of mechanical shaping and relying solely upon oven spread to achieve a desired cross-sectional profile in the baked good avoids sticking and tearing of the outer dough or casing by the post extrusion shaping equipment. Triple coextruded bar shaped products such as cookies with dissimilar concentric fillings, such as a fruit filling which enrobes or envelops a cheese-cake filling, may be continuously produced on a mass production basis.

Figure 1:
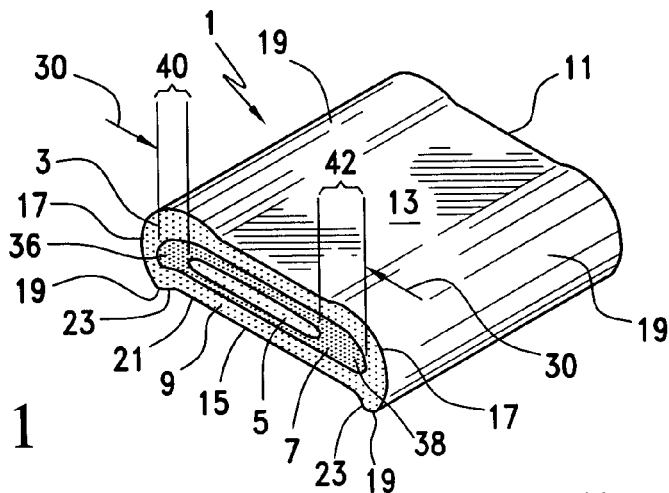
FIG. 1 is a perspective view of a triple coextruded baked cookie snack which may be produced in accordance with the present invention.
Figure 2:
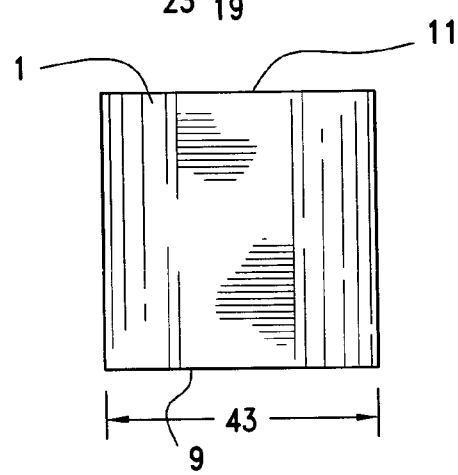
FIG. 2 is a top view of the baked snack of FIG. 1.
Figures 3, 4:
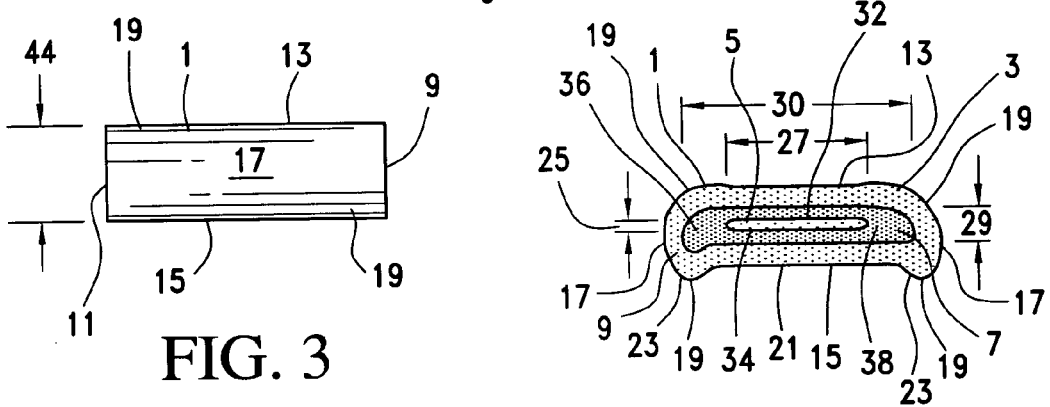
FIG. 3 is a left side view of the baked snack of FIG. 1.
FIG. 4 is a front end view of the baked snack of FIG. 1, the rear end view (not separately shown) being a mirror image thereof.
Figures 5, 6:
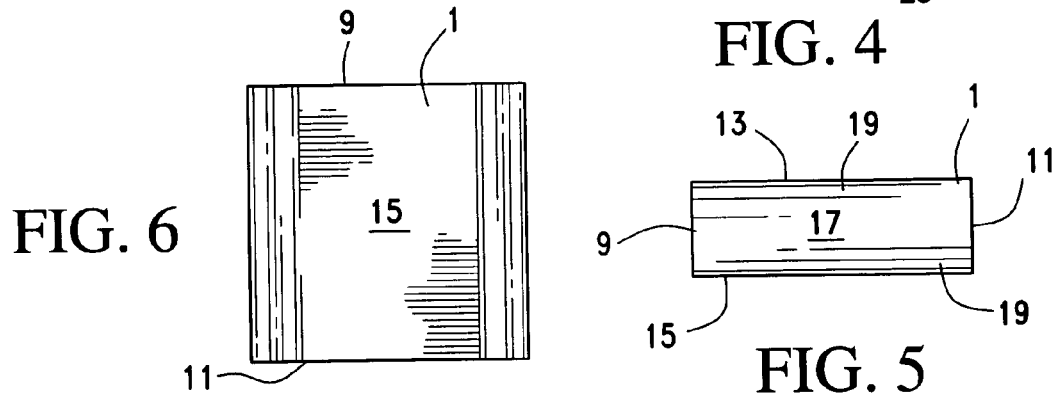
FIG. 5 is a right side view of the baked snack of FIG. 1.
FIG. 6 is a bottom view of the baked snack of FIG. 1.

A triple coextruded baked cookie snack which may be produced by triple extrusion in accordance with the present invention is shown in FIGS. 1-6. The baked product 1 of FIGS. 1-6 has a farinaceous-based casing 3, such as a cookie dough enrobing two concentric dissimilar fillers or fillings 5, 7. The innermost, core, or first filling 5 is enrobed by a middle or second filler 7 and both fillings 5 and 7 are visually apparent at the opposing cut front and rear ends 9 and 11, respectively, of the baked good as shown in FIGS. 1 and 4. The baked product 1 has a substantially flat top surface 13 and a substantially flat bottom surface 15 and rounded or curved sides 17 and shoulders 19. The bottom surface may have a slightly indented or recessed central portion 21 with slightly protruding side edges 23 resulting from cooling or moisture migration. The ratio of the maximum cross-sectional width 43 to the maximum cross-sectional height 44 of the baked good 1 may preferably be about 3:1.

The core or first filler 5 has a substantially uniform thickness or height 25 across its width 27 as shown in FIGS. 1 and 4. Likewise, the middle or second filler 7 has a substantially uniform thickness or height 29 across its width 30, taking into account the height 25 of the first filler 5. The thin top portion 32 of the second filler 7 above the core or first filler 5 is at least substantially uniformly thick and continuous across the width 27 of the core 5. Likewise, the thin bottom portion 34 of the second filler 7 below the core or first filler 5 is at least substantially uniformly thick and continuous across the width 27 of the core 5. The thin top and bottom portions 32 and 34, respectively may have at least substantially the same uniform thickness. The end or side portions 36, 38 of the middle or second filler 7 may have at least substantially the same uniform thickness. The end or side portions 36, 38 may have an annular width or thickness 40, 42, respectively, which is substantially larger, for example up to about 2 to 4 times larger, or about the same as the annular thickness or height of the top and bottom portions 32 and 34.

Figure 7:
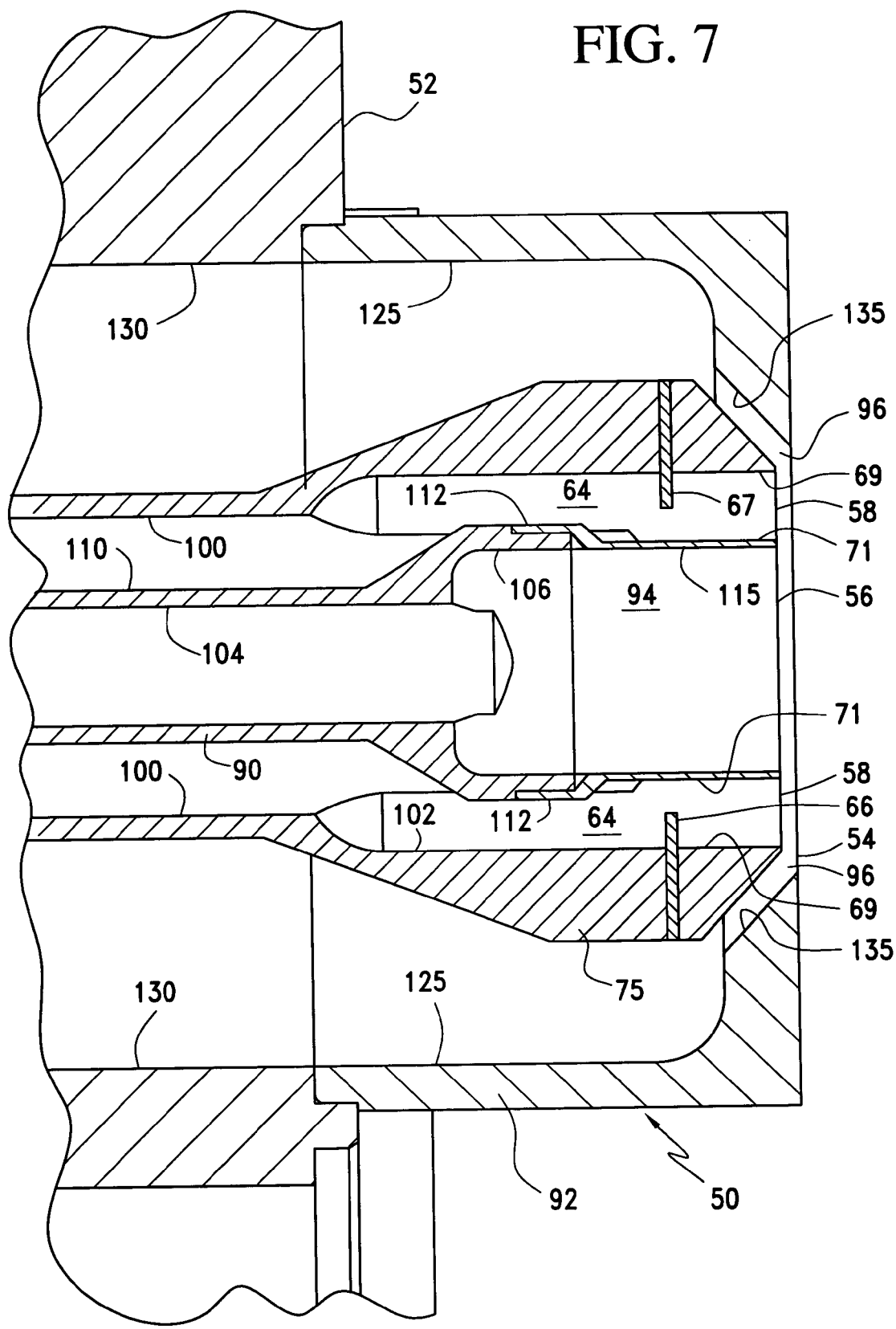
FIG. 7 is an enlarged, schematic, top cross-sectional view of a triple coextrusion die block which may be used to produce a triple coextrudate rope which may be baked and cut to obtain a baked snack as shown in FIG. 1.
Figure 8:
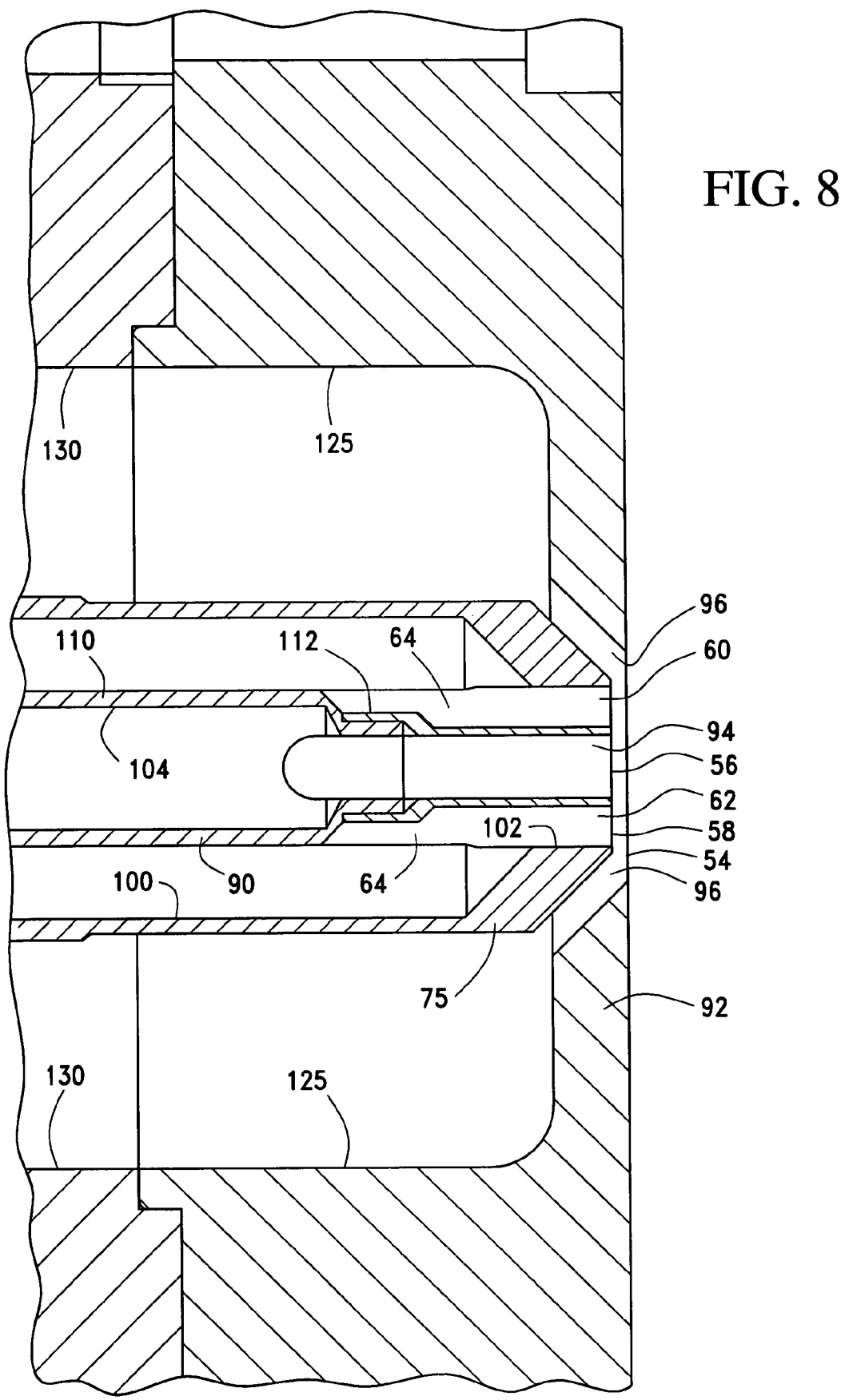
FIG. 8 is an enlarged, schematic, cross-sectional side view of a triple coextrusion die block which may be used to produce a triple coextrudate rope which may be baked and cut to obtain a baked snack as shown in FIG. 1.
Figure 9:
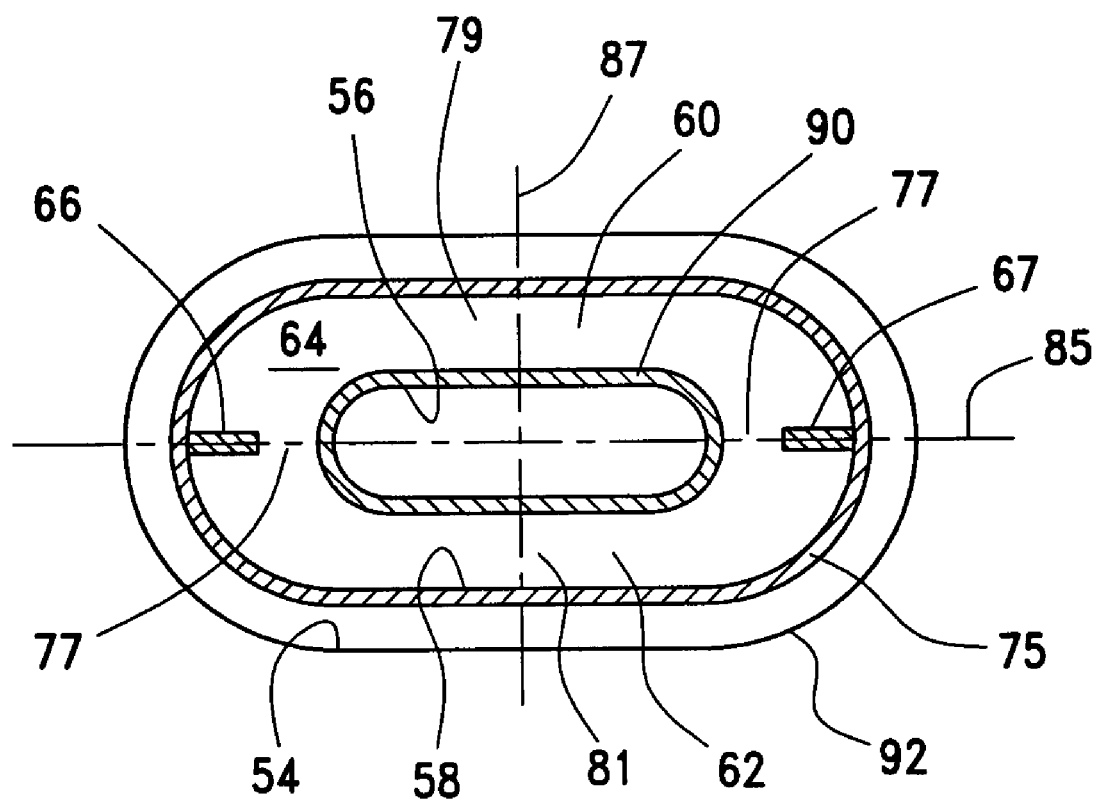
FIG. 9 is an enlarged, schematic, front view showing the three oblong or elongated oval die orifices which may be used to produce a triple coextrudate rope which may be baked and cut to obtain a baked snack as shown in FIG. 1.

The baked snacks such as the cookie snack product 1 of FIGS. 1-6 may be continuously produced by triple extrusion using one or a plurality of triple coextrusion die blocks or nozzles contained in a die head fed by a manifold to produce a triple coextrudate rope which may be baked and cut to obtain the baked snack 1. A die block 50, attached to a die head 52, which may be used to produce the triple coextrudate rope is shown schematically in FIGS. 7-9, 10, 10A-10F, 11, 11A-11D, 12, 12A-12F, 13, and 13A-13C. The triple coextruded rope may be produced by coextruding a dough or casing and two dissimilar first and second fillings through three concentric die orifices 54, 56, 58 as shown in FIGS. 7, 8, and 9. The dough is extruded through the outermost die orifice 54. The first filling or core is extruded through the innermost die orifice 56. The second or middle filling is extruded through the middle die orifice 58.

In a preferred embodiment, to obtain a baked good 1 having a maximum cross-sectional width 43 to maximum cross-sectional height 44 ratio of about 3:1, the corresponding ratios for the three concentric die orifices 54, 56, and 58 may be about 1.8:1 (outermost or casing orifice), 3.8:1 (innermost or core orifice), and 2.4:1 (middle orifice), respectively. The increased ratio (3:1) for the baked product compared to the ratio for the outermost die orifice 54 (1.8:1) is substantially attributed to oven spread and lay-time on conveyor belts rather than any mechanical flattening with a roller or other flattening means.

Undesirable excessive flow of the middle or second filling or layer towards the cross-sectional ends rather than the top and bottom of the triple coextrudate is substantially reduced by diverting and constricting or obstructing the flow of the second or middle filling through the middle die orifice 58 so that it flows towards the top and bottom elongated portions 60, 62, respectively of the middle annulus 64. The diversion or obstruction results in an extrudate rope and a baked product having a substantially even middle concentric layer which is desirably uniformly thick and continuous at least across the top and bottom. The middle concentric layer may be thicker or substantially the same width-wise at its opposing end portions compared to its thickness height-wise at its top and bottom portions.

Figure 10A:
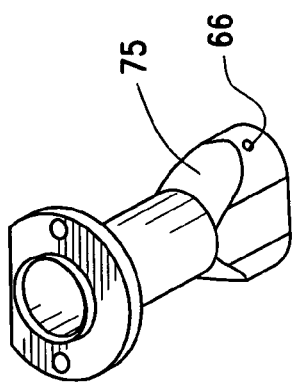
FIG. 10A is back perspective view of the middle nozzle of FIG. 10.
Figure 10:
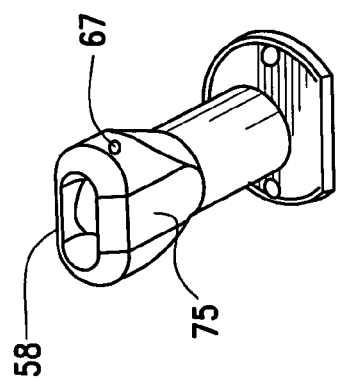
FIG. 10 is a front perspective view of a middle nozzle of the extrusion block for extrusion of the middle filler or second layer of the baked good of FIG. 1.
Figure 10C:
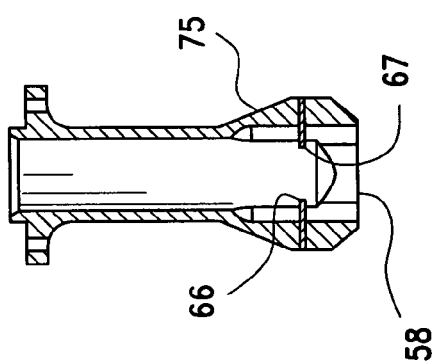
FIG. 10C is a cross-sectional view along line 10C-10C of FIG. 10B.
Figure 10B:
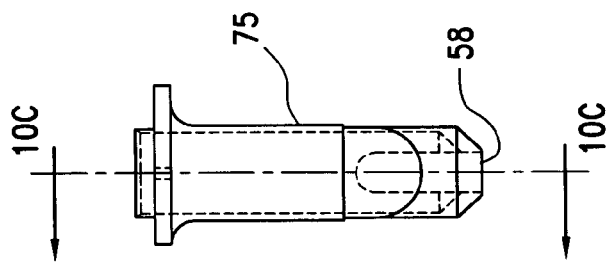
FIG. 10B is a side view of the middle nozzle of FIG. 10.
Figure 10E:
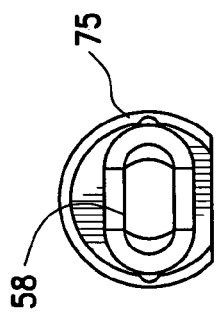
FIG. 10E is a front view of the downstream end of the middle nozzle of FIG. 10.
Figure 10D:
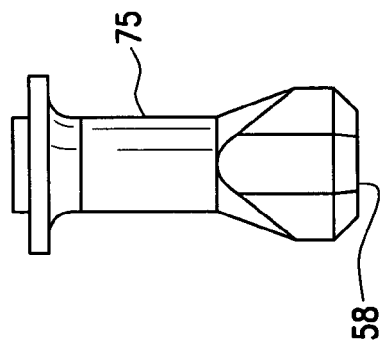
FIG. 10D is a top view of the middle nozzle of FIG. 10.
Figure 10F:
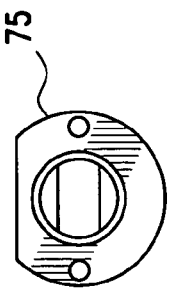
FIG. 10F is rear view of the upstream end of the middle nozzle of FIG. 10.

The diversion or obstruction may be achieved with the use of pins 66, 67 located in the middle annulus 64 as shown in FIGS. 7, 9, 10, 10A, and 10C. FIG. 10C is a cross-sectional view along line 10C-10C of FIG. 10B. As depicted in FIGS. 7, 9, and 10C, the pins 66, 67 may extend or protrude from the outer wall 69 of the middle annulus towards the inner wall 71 of the middle annulus 64. In embodiments of the invention the pins may extend from about 20% to about 80%, for example from about 40% to about 60% across the middle annulus 64. The pins 66, 67 or other obstruction or flow diverter may be fixedly secured in or on the wall of the middle nozzle 75 by pressure fit, screwing, welding, or other conventional fastening means. The pins 66, 67 are preferably cylindrical in cross-section, but other flow directing shapes may be employed. Pin diameters may range from about 0.5 mm to about 3 mm, for example about 1 mm. The pins are located in and help to increase pressure in the thicker end regions 77 of the middle annulus 64 and direct flow of the middle layer or second filler to the thinner top region 79 and thinner bottom region 81 of the middle annulus 64 thereby preventing unevenness and discontinuity of the middle or second filler in the top and bottom regions 79, 81. The obstructions, such as pins 66, 67 may be located sufficiently upstream of the downstream terminus of middle annulus 64, so as to permit the desired diversion of flow of the middle layer or second filler in the middle annulus while avoiding any substantial flow back from the top and bottom elongated portions 60, 62 to the end portions 77, downstream of the pins 66, 67. In embodiments of the invention, the pins 66, 67 may be located a distance upstream the terminus of middle annulus 64 or upstream orifice 58, which is equal to about 1 to 2.5 times the middle annulus width at its terminus.

As shown in FIGS. 7-9, the three die orifices 54, 56, 58 may each be oblong or elongated oval die orifices with a substantially rectangular, elongated central portion and two semi-circular end portions concentrically arranged about a longitudinal or horizontal axis 85 and a vertical axis 87.

As depicted in FIGS. 7-9, 10, 10A-10F, 11, 11A-11D, 12, 12A-12F, 13, and 13A-13C the die block 50 includes a middle nozzle 75, a central or core nozzle 90, and an outer or casing nozzle 92 which are joined or fitted together to form a central or core flow path or bore 94, an annular middle flow path or bore 64, and an annular outer or casing flow path or bore 96.

The middle nozzle 75 of the extrusion block 50 for extrusion of the middle filler or second layer of the baked good of FIG. 1 is shown in FIGS. 7-10 and FIGS. 10A-10F. The middle nozzle 75 includes an upstream circular or cylindrical bore 100 which transitions into a downstream elongated oval bore 102.

The central or core nozzle 90 of the extrusion block 50 for extrusion of the core or first filler of the baked good of FIG. 1 is shown in FIGS. 7-9, 11, 11A-D, 12, and 12A-12F. The central, innermost, or core nozzle 90 includes an upstream circular bore 104 which transitions into an elongated oval bore 106. The central nozzle 90 is a multipiece structure containing an upstream elongated portion 110 joined, by welding for example at joint 112, to a downstream terminal or end portion 115. FIG. 11C is a cross-sectional view along line 11C-11C of FIG. 11A and FIG. 11D is a cross-sectional view along line 11D-11D of FIG. 11B showing the elongated portion 110 joined to the oblong shaped end portion 115.

FIG. 12C is a cross-sectional view along line 12C-12C of FIG. 12B and FIG. 12D is a cross-sectional view along line 12D-12D of FIG. 12C. The end portion 115 as shown in FIGS. 12C, 12D and 12F has a slight internal ledge portion 116 in its elongated oval bore at its upstream end 118 for receiving the upstream elongated portion 110. The downstream end 120 contains the elongated oval orifice 56.

The outer or casing nozzle 92 of the extrusion block 50 for extrusion of the dough or casing layer of the baked good of FIG. 1 is shown in FIGS. 7-9, 13, and 13A-13C. FIG. 13B is a cross-sectional view along line 13B-13B of FIG. 13A. FIG. 13C is a cross-sectional view along line 13C-13C of FIG. 13B. The casing nozzle 92 includes an upstream circular or cylindrical bore 125 which transitions from an upstream cylindrical bore 130 into a downstream tapering elongated oval bore 135. The tapering or chamfer may be at about 45° and ends at elongated oval orifice 54.

In a preferred embodiment, the core or central nozzle is fabricated as a single or integral piece as shown in FIGS. 14 and 14A-14E. FIG. 14C is a cross-sectional view along line 14C-14C of FIG. 14B showing the downstream, elongated oval orifice 56A of a single piece central or central nozzle 90A. FIG. 14D is a detail view of the opposing or upstream end depicted as detail 14D in FIG. 14C. The single piece core or central nozzle 90A includes an upstream circular bore 104A which transitions into an elongated oval bore 106A and terminates with the elongated oval orifice 56A.

The die blocks 50 may be employed with conventional coextruders such as those manufactured by Meinke, APV, and Rheon Manufacturing Co. A Meinke V45 triple coextruder is preferred. In embodiments of the invention, the triple coextruder and up to about 20 die blocks 50 may be employed to produce up to about 20 rows of triple coextruded dough ropes having consistent weights from row to row.

In accordance with preferred embodiments of the present invention, the triple coextruded dough rope containing the two fillers surrounded by an unbaked, unleavened cookie dough may be transported by conveyers to an oven and baked using conventional baking temperatures and times to obtain a baked dough rope which may be cut into desired bar size lengths, for example from about 1 inch to about 6 inches. In preferred embodiments, the baked dough ropes are cut into squares, or into rectangles which are about 1⅝ in. long and about 1.5 inches wide.

Cutting of the dough ropes with a conventional gang traveling cutter tends to smear one filler into another. In preferred embodiments, the baked dough ropes may be cut using fluid jet cutting, and most preferably with an ultrasonic cutter. Commercially available ultrasonic cutters may be employed to avoid or substantially eliminate substantial visual smearing of one filler layer, such as a red colored cherry filling, into the other, such as a white cheese-cake filling, and vice verse.

Any conventional filler materials for a snack product may be used as the core or first filler and the middle or second filler in the present invention. The fillers may be cooked or uncooked and are preferably bakeable without undergoing leakage or bleed out from the cut ends of the baked product. The two fillers may preferably have substantially the same viscosity but substantially different color, flavor, texture, or combinations thereof. In embodiments of the invention the fillers may comprise jelly, peanut butter, jam, chocolate, or a filling made from fruit, vegetable, meat, candy, cooked dough, pudding, caramel, spices or seasonings such as cinnamon, cheese, cheesecake or other edible filler materials, and mixtures thereof. The fillings may optionally include particulate material or chunks, for example chocolate chips, butterscotch chips, or other flavor chips, chunks of nuts, pieces of fruits such as apple, cherry, peach, or banana, raisins, chunks of vegetables, candy or the like. Preferred combinations are: 1) a cheesecake core filling and a surrounding cherry middle filling, 2) a cream core filling and a surrounding strawberry middle filling, and 3) a caramel core filling and a surrounding apple middle filling. In other preferred embodiments, one filler may be a peanut butter filler and the other may be a jelly or chocolate filler. In other embodiments, one filler may be an apple filler with apple particulates and the other filler may comprise caramel and cinnamon.

The casing material may be a conventional leavenable snack dough, such as a cookie dough which may undergo insubstantial expansion or leavening upon extrusion and substantial or little spread upon baking. The casing material may also comprise an expansible dough. The doughs employed are preferably uncooked or substantially ungelatinized prior to entry into the triple coextrusion die.

What is claimed is:

1. A method for producing a triple coextruded baked snack bar having a desired substantially smaller height than width comprising producing a triple coextruded rope by coextruding a dough and two dissimilar first and second fillings through three concentric die orifices wherein the dough is extruded through the outermost die orifice, the first filling is extruded through the innermost die orifice, and the second filling is extruded through the middle die orifice, obstructing the flow of said second filling so as to obtain a more uniform annular thickness of said second filler in the triple coextruded rope, baking the triple coextruded rope, and cutting the baked rope into pieces having distinct, dissimilar fillings which are visually apparent at opposing ends.

2. A method as claimed in claim 1 wherein each of said three concentric die orifices have a substantially rectangular middle section and round end sections.

3. A method as claimed in claim 1 wherein the flow of said second filling is obstructed with a plurality of flow-directing pins.

4. A method as claimed in claim 1 wherein said cutting is ultrasonic cutting.

5. A method as claimed in claim 1 wherein said baking results in a bar-shaped product having rounded top and bottom shoulders along the length of the bar-shaped product, a substantially flat top, and a substantially flat bottom.

6. A method as claimed in claim 1 wherein the baked outer dough has a substantially uniform thickness around the entire periphery of the snack bar, and the visually apparent first filling is at least substantially rectangular in cross-section.

7. A method as claimed in claim 1 wherein the ratio of the maximum cross-sectional width to the maximum cross-sectional height of the snack bar is at least about 1.75:1.

8. A method as claimed in claim 1 wherein said snack bar is a cookie, said first filling is a cheesecake filler, and said second filler is a cherry filler.

9. A method as claimed in claim 1 wherein each of said three concentric die orifices has an oval cross-section, said baking results in a bar-shaped product having rounded top and bottom shoulders along the length of the bar-shaped product, a substantially flat top, and a substantially flat bottom.

10. A method as claimed in claim 6 wherein each of said three concentric die orifices has an oval cross-section, said baking results in a bar-shaped product having rounded top and bottom shoulders along the length of the bar-shaped product, a substantially flat top, and a substantially flat bottom without post-extrusion rolling of the triple coextruded rope.

11. A method as claimed in claim 3 wherein said pins extend or protrude from an outer wall of the middle annulus towards the inner wall of the middle annulus from about 20% to about 80%, across the middle annulus.

12. A method as claimed in claim 1 where the second filling is obstructed to increase pressure in thicker end regions of the middle annulus and to direct flow of the second filler to a thinner top region and thinner bottom region of the middle annulus thereby preventing unevenness and discontinuity of the second filler in the top and bottom regions.

13. A method as claimed in 1 wherein the flow of said second filling is obstructed in cross-sectional end regions of a middle annulus so that the flow of the second filling is directed to cross-sectional elongated top and bottom regions of the middle annulus.

14. A method as claimed in 3 wherein the pins are located in cross-sectional end regions of a middle annulus so that the flow of the second filling is directed to cross-sectional elongated top and bottom regions of the middle annulus.

15. A method as claimed in 14 wherein the pins are located a distance upstream the terminus of the middle annulus which is equal to about 1 to 2.5 times the middle annulus width at the terminus.

16. A method for producing a triple coextruded cookie bar comprising coextruding a dough and two dissimilar first and second fillings through three concentric die orifices wherein the dough is extruded through the outermost die orifice, the first filling is extruded through the innermost die orifice, and the second filling is extruded through the middle die orifice, diverting the flow of said second filling through said middle die orifice to obtain a triple coextruded rope having a middle filling with opposing sides which are substantially thicker than the remaining opposing sides of the middle filling, baking the triple coextruded rope, and cutting the baked rope into pieces having distinct, dissimilar fillings which are visually apparent at opposing ends.

17. A method as claimed in claim 16 wherein each of said three concentric die orifices are oval shaped, the flow of said second filling is diverted with a plurality of flow-directing pins, and said cutting is ultrasonic cutting.

18. A method as claimed in claim 17 wherein said baking results in a bar-shaped product having rounded top shoulders, rounded bottom shoulders, a flat top and a flat bottom.

19. A method as claimed in claim 18 wherein the baked outer dough has a substantially uniform thickness around the entire periphery of the cookie bar, and the visually apparent first filling is at least substantially rectangular in cross-section.

20. A method as claimed in 16 wherein the flow of said second filling is diverted from cross-sectional end regions of a middle annulus so that the flow of the second filling is directed to cross-sectional elongated top and bottom regions of the middle annulus.

21. A method as claimed in 16 wherein obstructions are located in cross-sectional end regions of a middle annulus so that the flow of the second filling is directed to cross-sectional elongated top and bottom regions of the middle annulus.

22. A method as claimed in 21 wherein the obstructions are located a distance upstream the terminus of the middle annulus which is equal to about 1 to 2.5 times the middle annulus width at the terminus.

* * * * *